Aug. 19, 1969  H. ALBINGER, JR., ET AL  3,461,663
BATTERY OPERATED CLOCK
Filed Jan. 21, 1966  2 Sheets-Sheet 2

Inventors:
Harry Albinger Jr.,
Christie Petrides
by Leonard J Platt
Their Attorney United States Patent Office 3,461,663
Patented Aug. 19, 1969

3,461,663
BATTERY OPERATED CLOCK
Harry Albinger, Jr., Ashland, and Christie Petrides, Medway, Mass., assignors to General Electric Company, a corporation of New York
Filed Jan. 21, 1966, Ser. No. 522,199
Int. Cl. G04c 3/00
U.S. Cl. 58—23                    3 Claims

ABSTRACT OF THE DISCLOSURE

A battery operated clock which includes a permanent magnet synchronous motor driven by timing pulses supplied by an electro-mechanical oscillator. The electro-mechanical oscillator is comprised of an electronic transistor oscillator portion and a mechanical oscillator portion to which the electronic portion is inductively coupled. The synchronous motor is attached to the interior, front face of a clock housing; while the electronic and mechanical portions of the oscillator are attached to a back plate which connects to the housing in opposed, parallel relation to the front face of the housing. In order to promote assembly, bearings for rotatably supporting the internal mechanism of the clock are molded directly to the front face of the clock housing and to the back plate which attaches to the housing.

---

This invention relates to a battery operated clock and more particularly to novel arrangements and construction of the elements of a battery operated clock into a compact, inexpensive, and efficiently operating package.

A battery operated clock to which the present invention has particular relation may comprise a permanent magnet synchronous motor driven by timing pulses supplied by an electro-mechanical oscillator. The electro-mechanical oscillator is comprised of an electronic transistor oscillator portion of a mechanical oscillator portion to which the electronic portion is inductively coupled. Low frequency pulse signals are supplied by the electro-mechanical oscillator to the stator windings of the permanent magnet motor so that its rotor rotates at a speed synchronized with the frequency of the pulses. The electrical pulse output of the electro-mechanical oscillator is timed to a very precise frequency by the mechanical oscillating member. An electro-mechanical oscillator system which may be utilized in such a battery operated clock is described and claimed in a copending application to Jones, Ser. No. 522,290, which is assigned to the assignee of the present invention. A pulse type permanent magnet type synchronous motor which may be utilized in such a battery operated clock is described and claimed in copending application to Petrides, Ser. No. 522,129, which is also assigned to the assignee of the present invention. In order to provide an appealing but efficient and accurate time keeping mechanism it is desired to incorporate the synchronous motor and the electro-mechanical oscillator as well as other related elements of the time keeping mechanism into an easily assembled compact package.

It is therefore an object of this invention to provide an arrangement of parts of the elements of a battery operated clock which results in an inexpensive, compact package and which allows assembly in a relatively easy manner and which provides an efficiently running time keeping mechanism.

Briefly this object is achieved by means of an integrally molded casing into which the synchronous motor is secured and to which a backplate, which supports an electro-mechanical oscillator, is mounted. Bearings integrally molded or inserted into the front portion of the casing and to the back plate support rotating parts of the time keeping mechanism. The motor and the mechanical oscillator are separated by a maximum distance within the molded casing to prevent spurious magnetic couplings (feedback) between the mechanical oscillator and the synchronous motor. The electronic circuit and the gear train of the clock are mounted into the space between the synchronous motor and mechanical oscillator. The gear train and circuit are essentially nonmagnetic to further discourage magnetic coupling.

Figure 2:
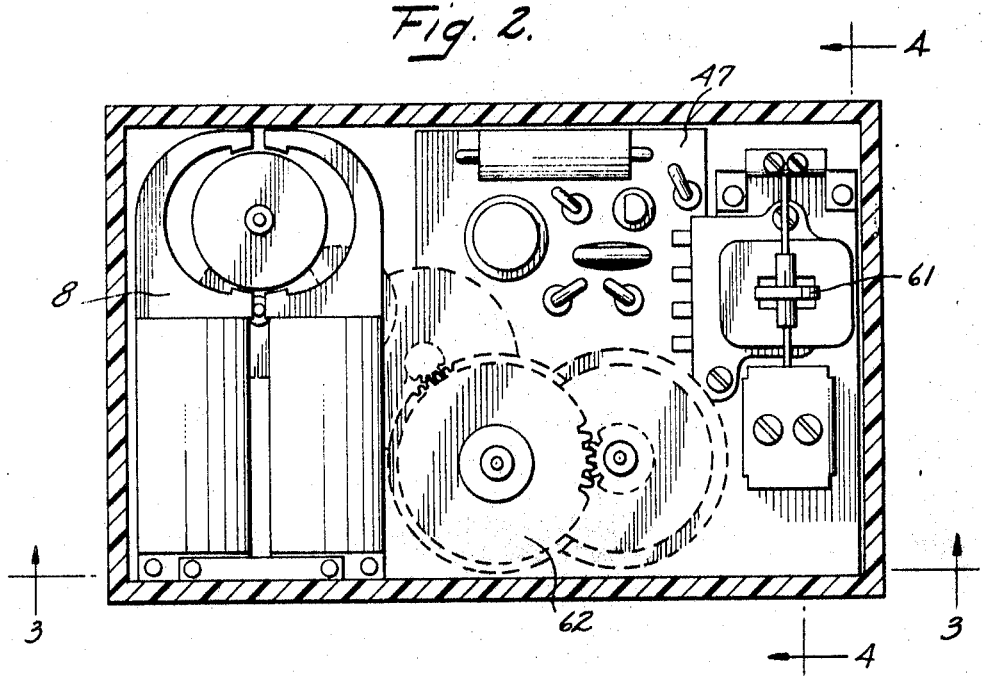
Figure 3:
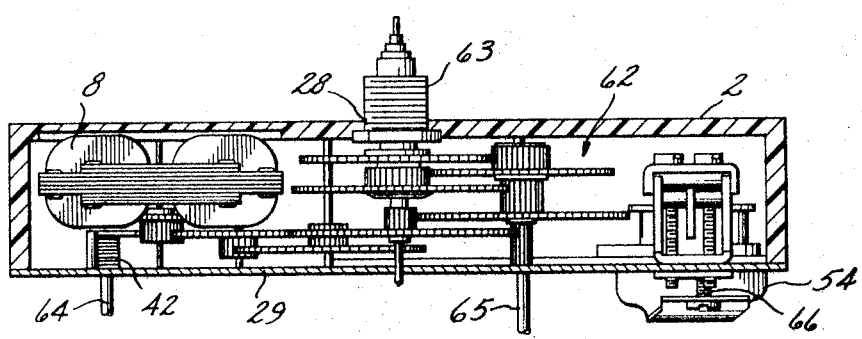
Figure 4:
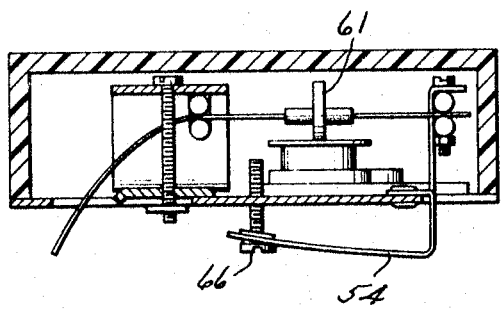

Our invention is particularly pointed and distinctly claimed in the appended claims. Our invention, however, both as to its organization and method of operation, together with further objects and advantages thereof, may best be understood with reference to the following description taken in conjunction with the accompanying drawings in which, FIG. 1 shows an exploded perspective view of a battery operated clock according to the teachings of the present invention, FIG. 2 shows a front view of the battery operated clock with its front portion removed according to the teachings of this invention, FIG. 3 shows a bottom view of the battery operated clock according to the teachings of this invention, and FIG. 4 shows an edge view of the battery operated clock according to the teachings of this invention.

Figure 1:
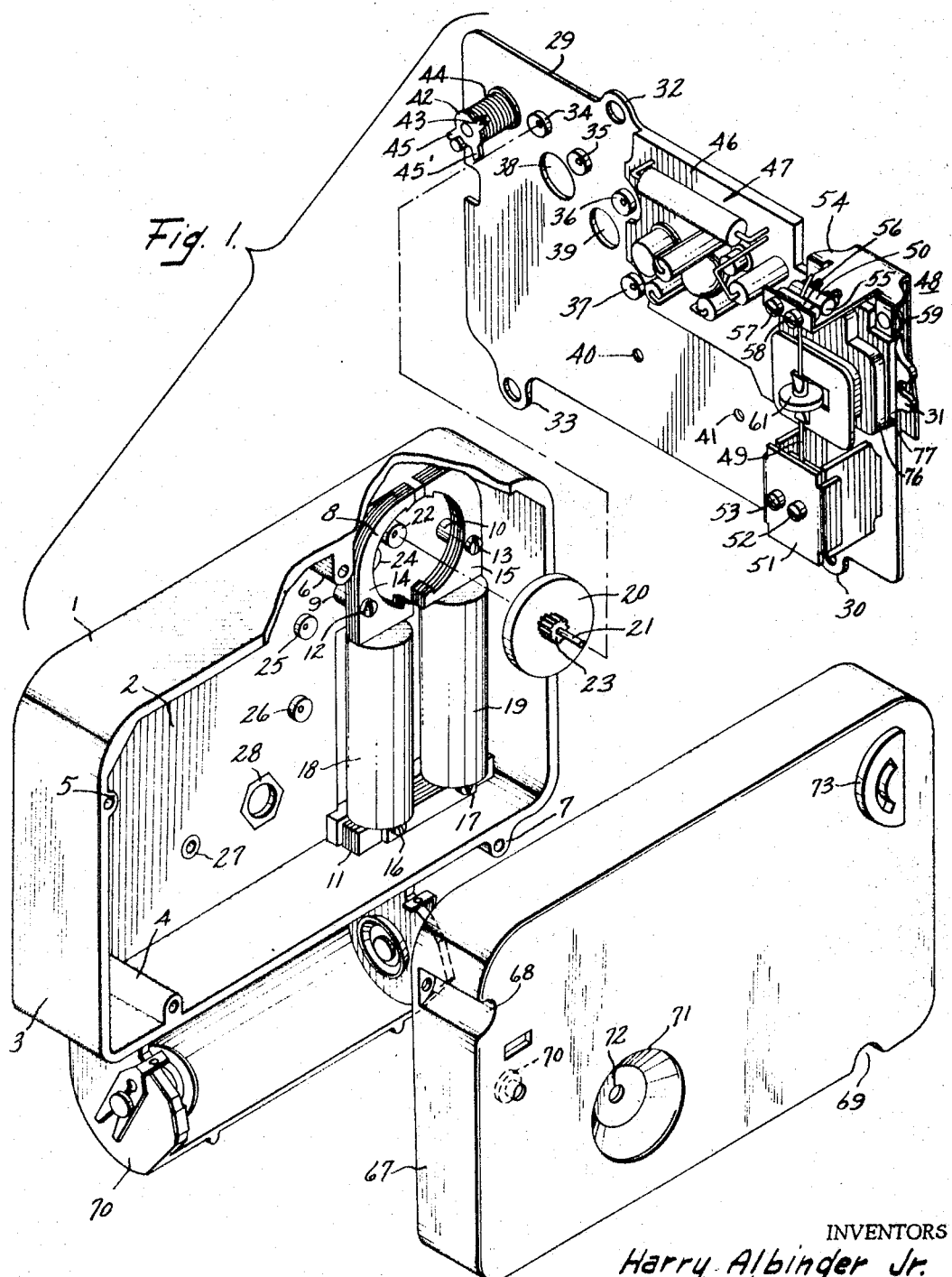

Referring now to FIG. 1 a molded casing 1 comprising a front portion 2 and rearwardly extending side portions 3 is shown including integrally molded screw holes 4, 5, 6 and 7 adapted to engage back plate mounting screws (not shown). A synchronous motor 8 is shown mounted in the casing 1 by means of mounting posts 9 and 10 and a lower mounting block 11. Screws 12 and 13 threadedly engage the mounting posts 9 and 10 through a pair of laminated stator sections 14 and 15 respectively. The lower portion of the stator pieces 14 and 15 are secured to the mounting block 11 by means of a second pair of screws 16 and 17. A pair of electric coils 18 and 19 are respectively wound around the stator pieces 14 and 15. A permanent magnet rotor 20 is shown adapted to be mounted within a circular area described by U-shaped sections of the lamented stator members 14 and 15. An axle 21 positioned through the permanent magnet rotor 20 engages with a bearing element 22 integrally molded or inserted into the front portion 2 of the casing 1 and has a gear 23 fixedly mounted therewith.

In addition to the bearing element 22, four additional bearings 24, 25, 26 and 27 are also integrally mounted or inserted into the front portion of the casing 1. These bearings are adapted to provide a low friction mounting for various gearing members (not shown) which mechanically link the gear 23 of the synchronous motor 8 with time indicating clock hands mounted exterior to the casing 1, also not shown. Hole 28 is formed in the front portion 2 of the casing 1 through which extend portions of the mechanical linkage between the gearing members and the clock hands.

A battery housing 70 adapted to contain one flashlight size "D" battery (not shown) is integrally molded to the underside of the casing 1.

Referring to the upper sector of FIG. 1 a back plate member 29 is shown including four screw hole fastening means 30 through 33 and four integrally mounted bearing elements 34 through 37. The screw fasteners 30 through 33 are adapted to be positioned adjacent the four integrally molded screw holes 4 through 7 in the casing 1 and the four bearing elements 34 through 37 are positioned such that when the back plate 29 is in place the bearings are directly opposite the four bearing elements 22, 24, 25 and 26 in the front portion 2 of the casing 1. Two holes 38 and 39 are formed in the back plate 29 to allow access between the mechanical gearing elements within the casing 1. Two holes 40 and 41 are bearing holes for mechanical gearing elements and adjusting means extending out from the back plate (not shown).

Since the bearing elements in the front plate of the casing 1 and in the back plate 29 are positioned opposite one another, they are readily adapted to mount therebetween the clock gears and the permanent magnet rotor 20 in relatively frictionless engagement. Also, the fact that these rotating elements are mounted between bearings which are integral with the front and back of the clock, no other mounting elements being necessary, easy and therefore inexpensive assembly of the elements into the clock is facilitated.

A starting means 42 comprising a gear sector 43 and a coil spring 44 is secured to the back plate 29 and is adapted to rotate through an angle defined by a pair of extension members 45 and 45' to give starting impetus to the rotor 20. This is accomplished by means of the gear teeth in the gear sector 43 engaging the gear teeth in the rotor gear 23. The coil spring is chosen such that the rotor is started at is synchronous speed. A starting arrangement as described generally herein is specifically described and claimed in copending application to Albinger, Ser. No. 522,197, assigned to the assignee of the present invention.

A circuit board 46 is positioned on the back plate 29 so that the planes of the back plate 29 and the circuit board 46 are parallel and adjacent. A plurality of electronic circuit elements generally defined by the reference number 47 and which define an electronic portion of an electro-mechanical oscillator extend from the circuit board 46 into the interior of the casing 1 when the back plate 29 is in place. The circuit elements 47 are secured to the circuit board by means of electric leads which extend through the circuit board to its back surface and which connect to a printed circuit (not shown). The circuit board 46 may comprise some insulating material such as phenolic and the printed circuit may comprise conducting material such as copper. The back plate 29 may be cut away in the area of the printed circuit so that electric connection can be made between the electronic oscillator circuit and the motor and an electric coil to be described hereinafter.

Mounted at the end of the backing plate 29 opposite the end adjacent the motor 8 is a mechanical portion 48 of an electro-mechanical oscillator comprising a torsion wire 49 and torsion wire end support means 50 and 51. The support means 51 is secured to the back plate 29 by means of a pair of bolts 52 and 53 and the support means 50 is secured to the back plate 29 by means of a tension spring adjusting means 54. The support means 50 comprises a pair of cylinders 55 and 56 secured to the tension spring adjusting means 54 by a pair of nut and bolt combinations 57 and 58 and between which one end of the torsion wire 49 is clamped. The tension spring adjusting means 54 is riveted to the back plate 29 by means of rivet 59 and another rivet 60 (which is hidden in this view by the body portion of the tension spring adjusting means 54). A screw (also hidden) is positioned through the tension spring adjusting means 54 to the back plate 29 at its rear surface so as to provide means for adjusting the tension of, and therefore the resonant oscillating frequency of, the torsion wire 69. A permanent magnet 61 is positioned near the middle of the torsion wire 49 and is readily adapted to oscillate therewith so as to set up an oscillator magnetic field.

Electric coils 76 are mounted on an extension 77 of the circuit board 46 such that its interior portion is physically adjacent the magnetic oscillating field set up by the oscillating permanent magnet 61. The electric coils 76 are connected in circuit relationship with the circuit elements 47 of the electronic portion of the electro-mechanical oscillator so that a magnetic coupling exists between the mechanical and the electronic portions of the electro-mechanical oscillator. The extension of the circuit board 46 on which the coil 76 is mounted is secured to the back plate 29 by any suitable means such as rivets. To simplify construction of the back plate assembly the securing means used to mount the coil 76 on the extension of the circuit board 46 may be the same rivets used to secure the circuit board 46 to the back plate 29, no other securing means for the circuit board 46 being necessary.

Referring to FIG. 2 a front view of the battery operated clock with front portion of the casing 1 removed is shown. In this figure it is evident that the permanent magnet motor 8 is physically separated at a maximum distance from the permanent magnet 61 of the mechanical portion of the electromagnetic oscillator. Thus spurious magnetic couplings or feedback between the mechanical oscillator and the synchronous motor are virtually eliminated. To further insure that spurious magnetic couplings are prevented, the electronic portion 47 of the oscillator is entirely comprised of nonmagnetic materials. Finally, a clock movement or gear train identified by the reference numeral 62 in FIG. 2 is also positioned in the space separating the permanent magnet motor 8 and the permanent magnet 61 and is also comprised of nonmagnetic materials.

FIG. 3 represents a bottom view of the battery operated clock and shows the placement of the gear train 62 with its mechanical linkage between the permanent magnet motor 8 and a center stack 63 extending through the hole 28 in the front portion 2. The center stack 63 is entirely conventional and no further description of its structure or operation is deemed necessary. It will be apparent that the hour hand, the minute hand, and the sweep second hand of the clock will be mounted to the center stack 63. As seen in FIG. 3 the starting means 42 for the synchronous motor 8 includes an extension member 64 extending through the back plate 29. Also extending through the back plate 29 is a time set shaft 65 which is adapted to provide a manual setting means for the battery operated clock. Finally, a set screw 66 for the tension spring adjusting means 54 is shown extending through the back plate 29.

Referring now to FIG. 4 an edge view of the battery operated clock is shown including the basic elements of the mechanical portion of the electromagnetic oscillator and the tension spring adjusting means. For a detailed description of the structure and operation of the tension spring adjusting means 54 reference is made to copending application to Albinger, Ser. No. 522,274, assigned to the assignee of the present invention.

Referring back to FIG. 1 a back cover 67 is depicted in exploded perspective so that it is adapted to be mounted to the casing 1. A pair of molded slots 68 and 69 in the back cover 67 line up with the screw holes 5 and 7 in the front casing 2 so that the same screws (not shown) that hold the back plate 29 to the front casing 2 may be utilized to secure the back cover. This means that in the assembly of the clock the back plate 29 will be held on with only two screws in holes 4 and 6 until the back cover 67 is put on with the other two screws. A rear bearing 70 is shown integrally molded or positioned in the interior surface of the back cover 67 to provide a bearing for the tension adjusting screw 66 for the tension spring adjusting means 54. A recessed portion 71 including a centered hole 72 is shown in the back cover 67 to provide a recess for the extension of the time set shaft 65. This allows manual access to the shaft yet protects the shaft from a wall or any other object to which the battery operated clock may be placed adjacent. Since the time set shaft is a constantly rotating part, prevention of contact between this part and the wall is essential. To provide a manual access for the starting means 42, a circular slot 73 is positioned in the back cover 67 so that the shaft 64 for the starting means 42 may extend therethrough. The back cover may be integrally molded in much the same manner and of the same material as the front casing 1. It provides a dust cover for the bearings and the moving parts of the battery operated clock and also as a cover for the tail end of the tension spring 49 to prevent tampering by curious unknowledgeable people.

The general operation of the battery operated clock is as follows: The batteries supply power to the synchronous motor and to the electro-mechanical oscillator. The torsion wire 49 is set into oscillation at its mechanical resonant frequency and the inductive coupling existing between the permanent magnet 61 and the electric coils 76 serves to generate driving pulses which are amplified by the electronic circuit and are used to maintain the torsion wire 49 in oscillation at its natural frequency. The output of the electronic circuit furthermore is coupled to the electric coils 18 and 19 on the stator pieces 14 and 15 of the synchronous motor 8 so that a pulse field exists at the U-shaped portions of the stator windings to provide rotating energy for the rotor 20. Thus, the rotor 20 rotates at an angular frequency which is accurately maintained proportional to the mechanical resonant frequency of the torsion wire 49. The rotor gear 23 drives the clock hands (not shown) by means of a linking gear train (also not shown).

It will be apparent that the assembly of the battery operated clock as described is made relatively simple since the electro-mechanical oscillator is secured only to the back plate 29 and not to the integrally molded casing 1. Therefore, the casing 1 with the synchronous motor 8 secured therein can be made in a manufacturing operation entirely separate from the mounting of the electro-mechanical oscillator on the back plate 29. The bearing elements formed in the casing and in the back plate can also be manufactured in independent operations. To assemble the clock after the two major separate parts are finished, all that is required is that the gear train and rotor be put in place and the back plate positioned so that the screw hole fastening means line up with one another. Two screws (not shown) are then employed to secure the back plate to the front casing. The back cover is then positioned in place and the final two screws are employed. All that is required to disassemble the clock for cleaning, replacement of parts, or any other reason, is that these four screws be removed.

The integrally molded casing 1 and back cover 67 can be made of a relatively inexpensive plastic material and may even be made transparent so that the interior workings of the clock may be viewed. This latter feature can be both functional (to ascertain where any malfunction or dirt accumulations may be occurring) and useful in appearance from an aesthetic standpoint.

Applicants have therefore described a novel arrangement and construction of elements of a battery operated clock which is compact and readily manufacturable by means of inexpensive techniques. Although applicants have described their invention in terms of a specific embodiment, it is not intended that the invention be limited to the specific embodiment described.

What is claimed as new and desired to be secured by Letters Patent of the United States is:

1. A battery operated time keeping mechanism including,
   (a) an integrally molded casing including a front portion and rearwardly extending side portions,
   (b) a back plate adapted to be secured to said integrally molded casing in parallel relationship with said front portion so as to define an interior portion of the time keeping mechanism.
   (c) a synchronous motor disposed within the interior portion of the time keeping mechanism and being secured to said integrally molded casing at a first side thereof,
   (d) an electro-mechanical oscillator secured to said back plate and extending into the interior portion of the battery operated clock, and electro-mechanical oscillator including
      (1) an electronic portion for supplying electrical driving pulses to said synchronous motor secured to a circuit board attached to said back plate, said electronic portion including a plurality of electronic components extending inwardly from said circuit board, said circuit board and said components being positioned adjacent said synchronous motor and relatively in the center of said casing, said electronic portion further including an electrical coil,
      (2) a mechanical portion comprising a torsion member secured at two ends thereof by means of supports secured to said back plate, said mechanical portion further including a centrally disposed permanent magnet, said permanent magnet being disposed within a magnetic field of said electric coils created by electrical pulses in said electric coils generated by said electronic portion, and
   (e) a back cover adapted to be secured to said integrally molded casing and covering said back plate.

2. A battery operated clock comprising:
   (a) a housing including a front portion and rearwardly extending side portions;
   (b) a back plate adapted to be secured in contact relationship to said side portion and in opposing parallel relationship to said front portion;
   (c) a synchronous motor secured to said housing in the interior thereof;
   (d) an electro-mechanical oscillator for timing said synchronous motor secured to said back plate and extending into the interior of said housing;
      (1) said oscillator comprising an electronic portion and a mechanical portion;
      (2) said mechanical portion comprising a torsion member secured to supports at either end thereof and including a centrally disposed permanent magnet;
      (3) said electronic portion including a circuit board secured to said back plate in parallel relationship therewith and having secured thereto a plurality of electronic components, the main portions of which are secured to said circuit board by means of electrical leads and which extend into the interior of said housing, said components being electrically connected to each other in circuit relationship by means of said electrical leads and by a printed circuit attached to said circuit board;
      (4) said electronic portion further including electric coils disposed adjacent said permanent magnet so that electric currents in said coils induce proportional magnetic forces to said permanent magnet; and
   (e) means coupled to said synchronous motor and being driven thereby to provide time indications.

3. A battery operated clock as defined in claim 2 and further including a plurality of pairs of bearing elements, said clock also including rotating parts within the interior of said housing suspended in a low friction engagement by means of said bearing elements, each pair of bearing elements comprising a first bearing secured to the interior surface of said front portion and a second bearing disposed opposite said first bearing on the interior surface of said back plate.

References Cited

UNITED STATES PATENTS 3,161,813  12/1964  De Wolf et al. _____ 58—23

FOREIGN PATENTS 627,897  9/1961  Canada.

RICHARD B. WILKINSON, Primary Examiner

E. C. SIMMONS, Assistant Examiner

U.S. Cl. X.R.

58—52